US011193564B2

(12) United States Patent
Guillot (10) Patent No.: US 11,193,564 B2
(45) Date of Patent: Dec. 7, 2021

(54) BELT TENSIONER

(71) Applicant: HUTCHINSON, Paris (FR)

(72) Inventor: Benoît Guillot, Larcay (FR)

(73) Assignee: HUTCHINSON, Paris (FR)

( * ) Notice: Subject to any disclaimer, the term of this patent is extended or adjusted under 35 U.S.C. 154(b) by 248 days.

(21) Appl. No.: 16/485,314

(22) PCT Filed: Feb. 14, 2018

(86) PCT No.: PCT/FR2018/050357
§ 371 (c)(1),
(2) Date: Aug. 12, 2019

(87) PCT Pub. No.: WO2018/150137
PCT Pub. Date: Aug. 23, 2018

(65) Prior Publication Data
US 2019/0376583 A1   Dec. 12, 2019

(30) Foreign Application Priority Data
Feb. 14, 2017  (FR) .......................................  1751196

(51) Int. Cl.
*F16H 7/08*  (2006.01)

(52) U.S. Cl.
CPC .............. *F16H 7/08* (2013.01); *F16H 7/0848* (2013.01); *F16H 2007/0802* (2013.01);
(Continued)

(58) Field of Classification Search
CPC ............... F16H 7/08; F16H 2007/0802; F16H 2007/0806; F16H 2007/0812;
(Continued)

(56) References Cited

U.S. PATENT DOCUMENTS 4,657,524 A * 4/1987 Okabe ..................... F16H 7/129
474/101
4,790,801 A * 12/1988 Schmidt ................ F16H 7/1236
474/110
(Continued)

FOREIGN PATENT DOCUMENTS

DE   196 09 420 A1   9/1997
JP   2001-221306     8/2001

OTHER PUBLICATIONS

International Search Report for corresponding PCT Application No. PCT/FR2018/050357, dated Apr. 30, 2018, with English Translation (5 pages).
(Continued)

*Primary Examiner* — Michael R Mansen
*Assistant Examiner* — Raveen J Dias
(74) *Attorney, Agent, or Firm* — Lewis Roca Rothgerber Christie LLP (57) ABSTRACT

The invention relates to a tensioner (100) comprising:
  a hollow body (10) provided with a bottom (12), said bottom comprising a central zone (120), a peripheral zone (121) raised relative to the central zone and an intermediate zone (122)
  an axis (30)
  two guide means (40, 50) for said axis
  two cups (60, 124), the cup (124) comprising a first portion (124A) in front of the peripheral zone and a second portion (124B) in front of the intermediate zone
  a spring (70) held between the cups and arranged around the second guide means so that there is a gap between the spring and the second guide means
  a valve (80) with a channel (90), the channel opening in front of the second portion of the cup (124) away from said second portion.

13 Claims, 8 Drawing Sheets

(52) U.S. Cl.
CPC ............... *F16H 2007/0806* (2013.01); *F16H 2007/0812* (2013.01); *F16H 2007/0859* (2013.01); *F16H 2007/0891* (2013.01); *F16H 2007/0895* (2013.01); *F16H 2007/0897* (2013.01)

(58) Field of Classification Search
CPC ..... F16H 2007/0814; F16H 2007/0859; F16H 2007/0891; F16H 2007/0895; F16H 2007/0897; F16H 7/0848; F16H 7/0836; F16H 7/1236
USPC ........................................................ 474/110
See application file for complete search history.

(56) References Cited

U.S. PATENT DOCUMENTS

| | | | | |
|---|---|---|---|---|
| 4,976,660 | A * | 12/1990 | Breindl | F16H 7/1236 474/110 |
| 5,785,619 | A * | 7/1998 | Nakakubo | F16H 7/08 474/109 |
| 5,967,923 | A | 10/1999 | Petri | |
| 6,106,424 | A * | 8/2000 | Kratz | F16H 7/0836 474/110 |
| 6,234,929 | B1 * | 5/2001 | Rasche | F16H 7/0836 474/110 |
| 9,046,176 | B2 * | 6/2015 | Sato | F16J 1/00 |
| 2005/0064970 | A1 * | 3/2005 | Tanaka | F16H 7/0836 474/110 |
| 2005/0130777 | A1 * | 6/2005 | Grunau | F16H 7/0848 474/110 |
| 2009/0298628 | A1 * | 12/2009 | Kawahara | F16H 7/1236 474/110 |
| 2010/0105506 | A1 | 4/2010 | Rointru | |
| 2011/0012045 | A1 * | 1/2011 | Schaefer | F16H 7/0836 251/337 |
| 2012/0024249 | A1 * | 2/2012 | Fuhrmann | F01L 1/2405 123/90.57 |
| 2012/0090457 | A1 * | 4/2012 | Kowalski | F16H 7/0836 91/468 |
| 2012/0202628 | A1 * | 8/2012 | Six | F16H 7/1236 474/110 |
| 2013/0260931 | A1 * | 10/2013 | Sato | F16H 7/12 474/110 |
| 2014/0057748 | A1 * | 2/2014 | Satomura | F16H 7/1236 474/110 |
| 2014/0378253 | A1 * | 12/2014 | Tanaka | F16H 7/08 474/110 |
| 2015/0252878 | A1 * | 9/2015 | Kitano | F16H 7/1236 474/101 |
| 2016/0230854 | A1 * | 8/2016 | Kitano | F16H 7/1236 |
| 2017/0045120 | A1 * | 2/2017 | Yokoyama | F16H 7/0829 |
| 2018/0066734 | A1 * | 3/2018 | Morimoto | F16H 7/1236 |
| 2018/0306281 | A1 * | 10/2018 | Morimoto | F16H 7/0836 |

OTHER PUBLICATIONS

Written Opinion for corresponding PCT Application No. PCT/FR2018/050357, dated Apr. 30, 2018 (6 pages).

* cited by examiner

Fig. 1(a)
(Prior Art)

Fig. 1b
(Prior Art)
Coupe D-D

Fig. 6
( Coupe A-A )

Fig. 7

BELT TENSIONER

CROSS-REFERENCE TO RELATED APPLICATION(S)

This application is a National Phase Patent Application of International Application Number PCT/FR2018/050357, filed on Feb. 14, 2018, which claims priority to French Patent Application Number 1751196, filed on Feb. 14, 2017, the entire contents of both of which are incorporated herein by reference.

The invention relates to a belt tensioner.

A tensioner of this type can in particular be found in the automotive field.

Such a tensioner is, for example, proposed in the document U.S. Pat. No. 5,967,923 (D1).

Figure 1A:
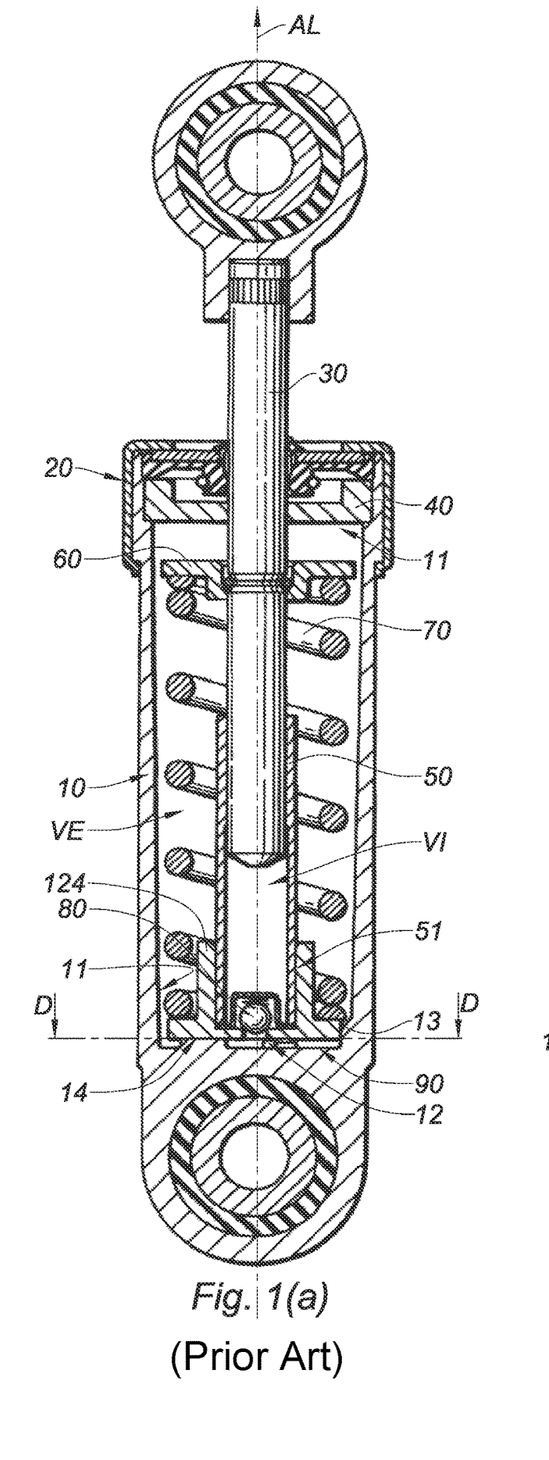
Figure 1B:
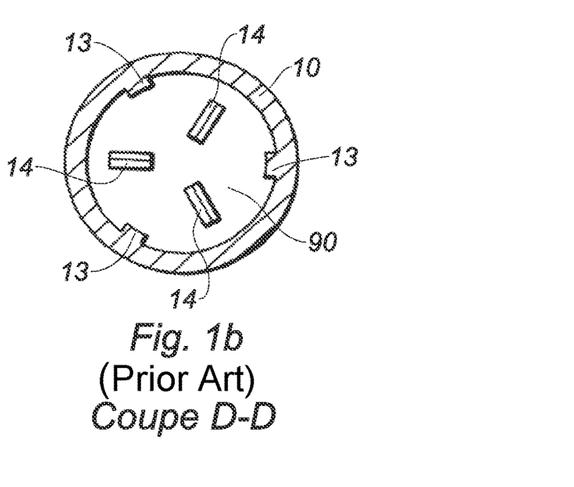

The tensioner proposed in this document is reproduced in FIG. 1, which comprises FIGS. 1(*a*) and 1(*b*).

FIG. 1(*a*) is a longitudinal sectional view of the tensioner and FIG. 1(*b*) a view of section D-D of FIG. 1(*a*).

This tensioner 100 is provided with a longitudinal axis AL. It comprises a hollow body 10 provided with an opening 11 and a bottom 12, the hollow body comprising a fluid. It also comprises a sleeve 20 arranged around the hollow body 10 and an axis 30.

This tensioner provides a first guide means 40 for said axis 30, this first guide means being attached to the hollow body 10 at the opening thereof.

It also comprises a second guide means 50 for said axis 30, this second guide means being in the form of a tube 50 that defines an inner volume VI wherein said axis 30 is intended to move and an outer volume VE that is outside said tube (50) within the hollow body 10. The end 51 (lower end) of the tube 50 is fixedly mounted (forcibly mounted) in a cup 124, the latter being placed on the bottom 12 of the hollow body 10 and more precisely on axial protrusions 14 projecting from the bottom 12. The cup 124 is furthermore held radially by other, radial and peripheral, protrusions 13 belonging to the hollow body 10.

This tensioner also comprises another cup 60 fixedly mounted on said axis 30 between the first 40 and second 50 guide means of said axis 30. It also comprises an elastic return means 70 arranged around the tube 50 so that there is a non-zero distance, taken radially, between the elastic return means 70 and the tube 50. The elastic return means 70 is held between the two cups 60, 124.

The tensioner finally comprises a valve 80 mounted at the lower end 51 of the tube 50, with which valve a fluid communication passage 90 is associated to allow the passage of a fluid contained in the hollow body 10 between the outer volume VE of the tube 50 and the inner volume VI that is inside said tube 50 (expansion).

The double guidance of the axis 30 proposed in this document makes it possible to hold the axis 30 along the longitudinal axis AL of the tensioner during the movements (expansion or compression of the tensioner) of the axis 30 in the tube 50.

This is useful for ensuring optimal operation of the tensioner.

However, with the design proposed in this document D1, the fluid capable of passing from the outer volume VE to the inner volume VI flows between the elastic return means 70 and the inner wall 11 of the hollow body 10, at the risk of being disturbed by the presence of the elastic return means (obstacle).

The flow is then disturbed and does not allow the operation of the tensioner to be optimised.

An object of the invention is to provide a belt tensioner with optimised operation, both during expansion and compression.

For this purpose, the invention proposes a tensioner with a longitudinal axis, comprising:
- a hollow body provided with an opening and a bottom, the hollow body comprising a fluid;
- a sleeve arranged around the hollow body,
- an axis,
- a first guide means for said axis, this first guide means being attached to the hollow body at the opening thereof;
- a second guide means for said axis, this second guide means being in the form of a tube that defines an inner volume wherein said axis is intended to move and a volume that is outside said second guide means within the hollow body;
- a first cup fixedly mounted on said axis between the first and second guide means of said axis;
- a second cup mounted at the bottom;
- an elastic return means arranged around the second guide means so that there is a non-zero distance, taken radially, between the elastic return means and the second guide means, said elastic return means being held between the first cup and the second cup;
- a valve comprising a seat mounted between one end of the second guide means and the bottom of the hollow body, with which valve at least one fluid communication channel is associated to allow the passage of a fluid contained in the hollow body between the outer volume of the second guide means and the inner volume that is inside said second guide means, without which:
- said bottom comprises a central zone, a peripheral zone that is raised relative to the central zone and an intermediate zone connecting the central zone to the peripheral zone;
- the first cup comprises a first portion in front of the peripheral zone and a second portion that is in front of the intermediate zone and in contact with a base of the seat, this base itself being in contact with the central zone;
- the elastic return means is designed to bear on the first portion of the first cup;
- said at least one fluid communication channel is arranged to open in front of the second portion of the first cup at a non-zero distance from this second portion, this arrangement allowing a fluid region of the hollow body to be defined around the second guide means up to said at least communication channel, said fluid region being free of any obstacle.

The tensioner according to the invention may also have at least one of the following features, alone or in combination:
- the sleeve is movably mounted relative to the body and the axis is fixedly mounted relative to the sleeve;
- the tensioner comprises a sheath, one end of which is in contact with the first portion of the first cup, the elastic return means then bearing on this end of the sheath, the sheath being furthermore arranged around the second guide means between the elastic return means and the second guide means at a non-zero distance, taken radially, from the second guide means, so that said fluid region of the hollow body that is free of any obstacle is defined between the sheath and the second guide means up to said at least one fluid communication channel;
- the elastic return means is a helical spring;
- the base of the seat has a dimension, taken radially, that is strictly smaller than the dimension, also taken radially, of the central zone of the bottom of the hollow body, so that there is a clearance between the seat and the intermediate zone;

the valve further comprises a dedicated elastic return means that is fixed relative to the seat; and a closure member that is attached to the dedicated elastic return means and rests on the base;

the closure member has a mass of between 50 mg and 700 mg and wherein the dedicated elastic return means is designed to apply a preload of between 0.05 N and 0.4 N in a direction so as to push the closure member against the seat;

the dedicated elastic return means has a stiffness k of between 30 N.m. and 80 N.m.;

the valve comprises a stop arranged to control the travel of the closure member;

the travel of the closure member is between 0.3 mm and 2.5 mm;

the closure member being a ball, the seat comprises a frustoconical inner portion for cooperating with the ball, this frustoconical inner portion being defined by an angle of between 30° and 90°;

the fluid contained in the hollow body is an oil;

the oil has a grade defined between the ISO VG5 standard and the ISO VG150 standard, these standards being defined by a kinematic viscosity according to the ISO 3448 standard.

The invention will be better understood and other aims, advantages and features thereof will become clearer on reading the description which follows and which is made with reference to the following appended figures:

FIG. 4, which comprises

Figure 2:
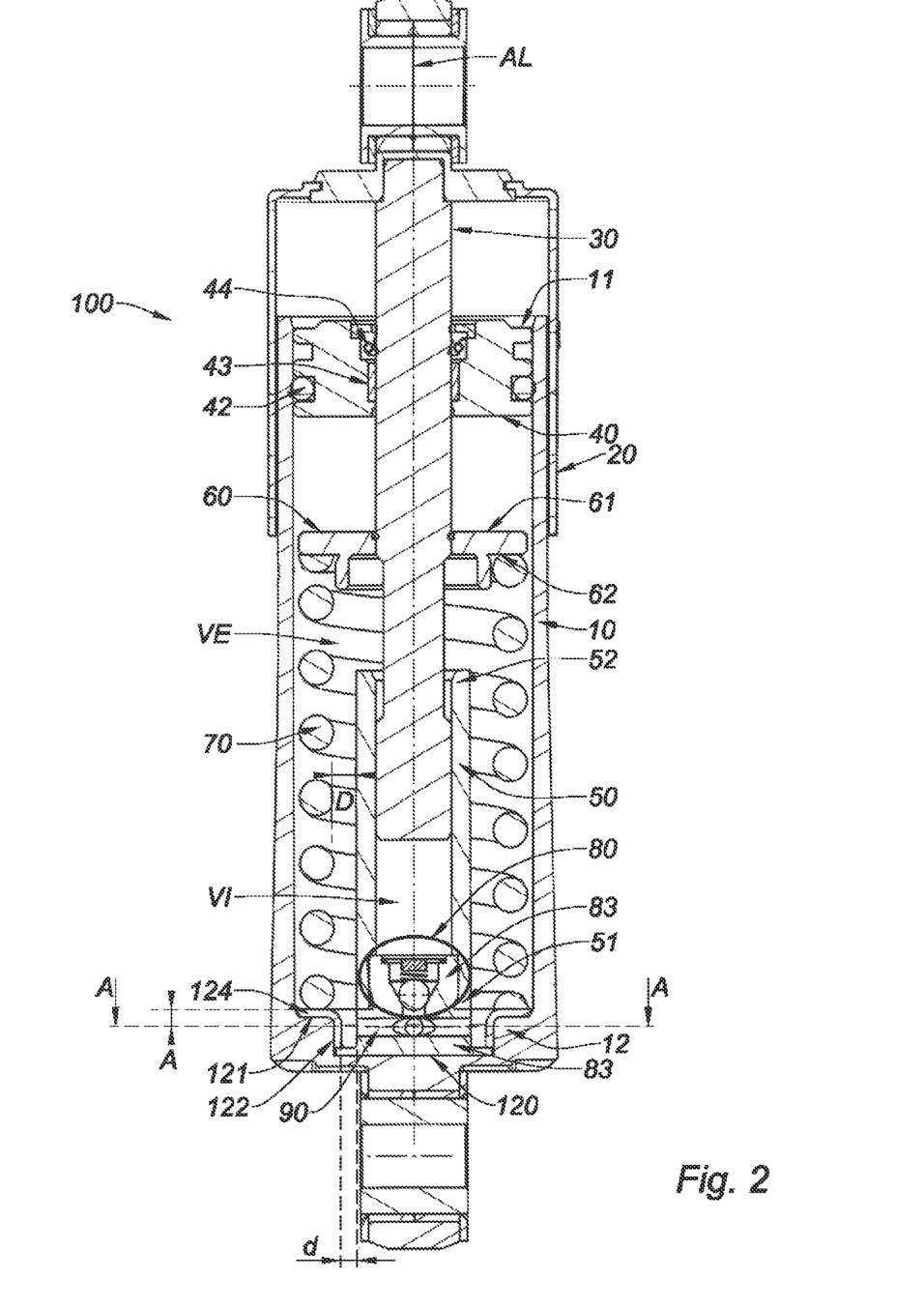
FIG. 2 shows a tensioner according to the invention, in a longitudinal sectional view.

A first embodiment of a tensioner 100 according to the invention is shown by FIG. 2.

More precisely, FIG. 2 is a longitudinal sectional view of this tensioner 100, in the middle position.

The tensioner 100 comprises a hollow body 10 that is provided with an opening 11 and a bottom 12 and a sleeve 20 arranged around the hollow body 10.

The tensioner 100 also comprises an axis 30.

In the case shown in FIG. 2, the sleeve 20 is movably mounted relative to the body 10 and the axis 30 is fixedly mounted relative to the sleeve 20. However, it could be otherwise, that is, the sleeve 20 could be fixedly mounted on the hollow body 10 and the axis movably mounted relative to the sleeve 20, as is for example the case in document D1.

The tensioner 100 also comprises a first guide means 40 for said axis 30. The first guide means 40 is fixed on the hollow body 10 at the opening 11 thereof. Furthermore, it is noted that the first guide means 40 forms a component for closing the hollow body 10, comprising a fluid. Also, to prevent any loss of fluid to the outside of the hollow body, the guide means 40 can accommodate one (as shown in FIG. 2) or a plurality of O-rings 42 to ensure fluid-tightness between the inner wall of the hollow body 10 and the first guide means 40. Similarly and for the same purpose, a seal 44 may be provided between the first guide means 40 and the axis 30 to prevent any fluid leakage.

In addition, in order to make it easier to guide the axis 30 in the guide means 40, it is advantageous to provide a plain bearing 43 at the interface of the axis 30/first guide means 40.

The tensioner 100 comprises a second guide means 50 for said axis 30. The second guide means 50 is in the form of a tube 50 that defines an inner volume VI wherein said axis 30 is intended to move and an outer volume VE that is outside said tube 50, within the hollow body 10.

The tube 50 is clamp-mounted on a seat 83 resting on the bottom 12 of the hollow body 10 and more precisely on a central zone 120 of this bottom 12. More generally, the seat 83 is therefore mounted between an end 51 of the tube 50 and the bottom 12 of the hollow body 10.

In fact, the bottom 12 comprises a central zone 120, a peripheral zone 121 that is raised relative to the central zone 120 and an intermediate zone 122 connecting the central zone 120 to the peripheral zone 121.

The seat 83 has a dimension $d_1$, taken radially and at said at least one fluid communication channel 90, that is smaller than the dimension $d_2$, also taken radially, of the central zone 120 of the bottom 12 of the hollow body 10. This allows a non-zero distance d to be defined between a channel opening 90 and a cup 124. The cup 124 therefore broadly matches the shape of the intermediate zone 122 and the periphery zone 121 of the bottom 12. Furthermore, the seat 83 comprises, in the lower part, a base 831 that is in contact with the central zone 120 of the bottom 12 of the hollow body 10. The width (diameter) of this base 831 is strictly between $d_1$ and $d_2$.

"Radially" should be understood, throughout the description, to mean a direction perpendicular or substantially perpendicular to the longitudinal axis AL of the tensioner 100.

The cup 124 is positioned at the bottom 12 of the hollow body 10. This cup 124 more precisely comprises a first portion 124A in front of the peripheral zone 121 of the bottom 12, with a non-zero clearance $J_4$, and a second portion 124B that is in front of the intermediate zone 122 and in contact with the seat 83, and more precisely in contact with the base 831 of the seat 83. The contact between the second portion 124B of the cup 124 and the seat 83 is made possible at the base 831. Furthermore, it is understood that the cup 124 rests on the base 831 of the seat 83.

It is therefore understood that the cup 124 rests on the base 831 of the seat 83, at the bottom 12 of the hollow body 10.

Furthermore, and in general, the seat 83 advantageously has a maximum dimension $d_3$ (which corresponds to the dimension of the base 831), taken radially, that is smaller than the dimension $d_2$ as defined above. The existence of a radial clearance J ($d_2-d_3$) enables self-centring between the tube 50 and the axis 30.

The tensioner 100 comprises a cup 60 that is fixedly mounted on the axis 30 between the first guide means 40 of the axis 30 and the second guide means of the axis 30, said second guide means being formed by the tube 50.

The tensioner 100 further comprises an elastic return means 70 arranged around the tube 50 so that there is a non-zero distance D, taken radially, between the elastic return means 70 and the tube 50. It should be noted that the elastic return means 70 is held between the two cups 60, 124.

The elastic return means 70 is advantageously, as shown in FIG. 2, a helical spring.

The seat 83 is held axially by the contact with the cup 124, the latter being subjected to the force exerted by the return means 70. The compression of the elastic return means 70 on the cup 124 makes it possible to permanently keep the seat 83 in contact with the bottom 12, in the central zone 120. For this purpose, it is advantageous to provide a clearance between the cup 124 and the peripheral zone 121 of the bottom 12.

Furthermore, the tensioner 100 comprises a valve 80 that is mounted at one end 51 (lower end) of the tube 50 and with which at least one fluid communication channel 90 is associated.

Figure 6:
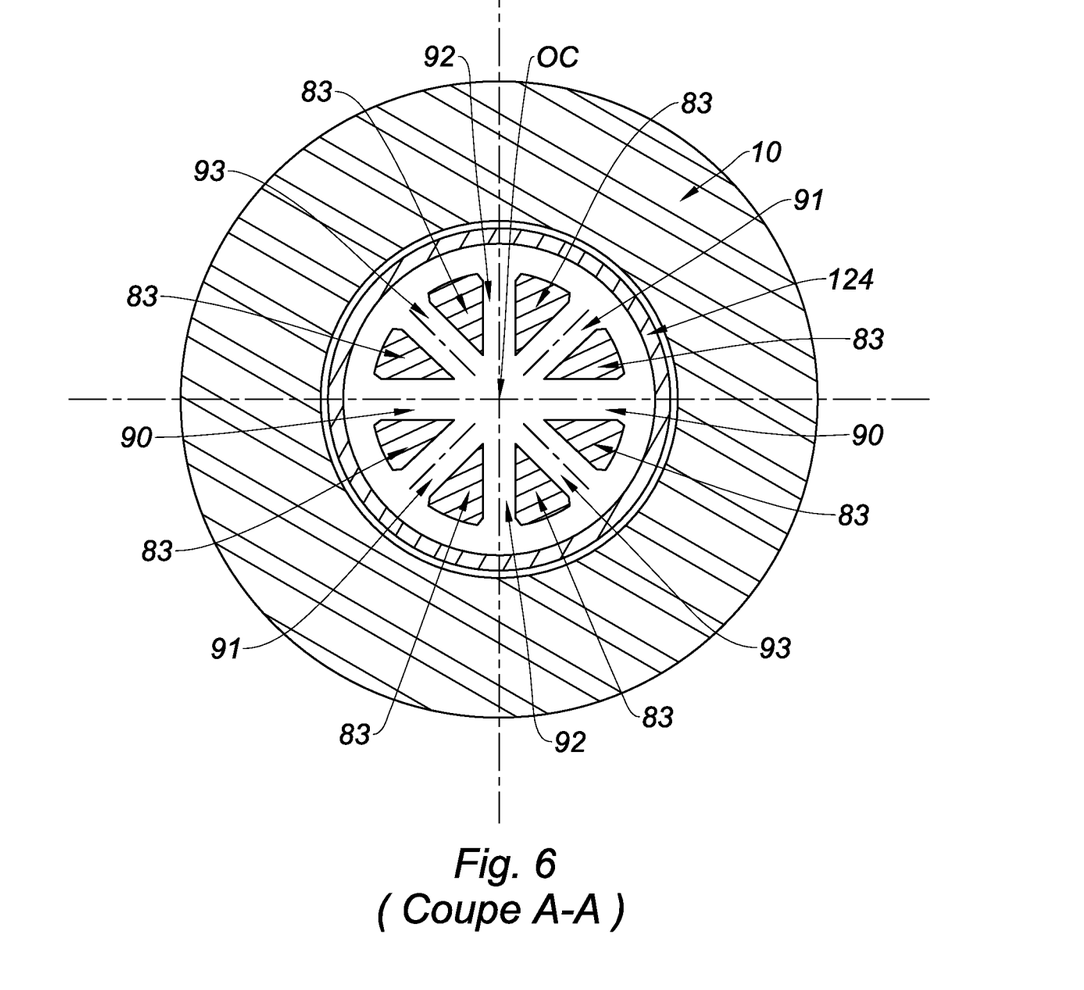
FIG. 6 is a view of FIG. 1 according to section A-A.

Advantageously, a plurality of fluid communication channels 90, 91, 92, 93 are provided, as can be seen in FIG. 6, which shows a section of FIG. 2, in section A-A. In this case, the valve 80 opens onto a central orifice OC. All the fluid communication channels 90, 91, 92, 93 distribute and converge in the central orifice OC.

The valve 80 will be described in more detail in the following part of the description.

Said at least one fluid communication channel 90 allows fluid contained in the hollow body 10 to pass between the outer volume VE that is outside the tube 50 and the inner volume VI of the tube 50.

The elastic return means 70 is designed to bear on the cup 124. This is consistent with the fact that there is a non-zero distance D separating, radially, the elastic return means 70 and the tube 50. The tube 50 is in fact placed and held on the bottom 12 by means of the seat 83, the latter being attached to the tube 50 at the upper end thereof.

Said at least one fluid communication channel 90 is arranged to open in front of the intermediate zone 122 at a non-zero distance d from this intermediate zone 122. Said at least one fluid communication channel 90 therefore does not open, in the outer volume VE, in front of the elastic return means 70. In operation, the flow of the fluid from the outer volume VE to the inner volume VI is therefore not at risk of being disturbed by the elastic return means 70.

In an advantageous case and as shown in FIG. 2, said at least one fluid communication channel 90 furthermore comprises a longitudinal axis which is arranged substantially radially, and advantageously radially, with reference to the tensioner 100. In other words, said at least one fluid communication channel 90 comprises a longitudinal axis which is advantageously substantially perpendicular to the longitudinal axis of the tensioner 100. In this case, it is possible to describe the absence of disturbance caused by the elastic return means 70 with the non-zero axial displacement A (that is, along the longitudinal axis of the tensioner 100) between the longitudinal axis of said at least one fluid communication channel 90 and the bearing zone of the elastic return means 70 on the peripheral wall 121 of the bottom 12 of the hollow body 10.

It will thus be understood that, in general, this arrangement (that is, the arrangement of the cup 124, the elastic return means 70 and said at least one fluid communication channel 90 relative to a specifically defined bottom) makes it possible to obtain a region of the hollow body 10, said region being defined around the tube 50 and at least up to said at least one communication channel 90, and being free of any obstacle. In the case in point, this region is in the form of a fluid ring around the tube 50 (of thickness D) and extends up to the central zone 120 (thickness d at this level) of the bottom 12 of the hollow body 10.

In the context of the invention, there is thus, particularly with respect to the operation of the tensioner proposed in document D1, a much more homogeneous, undisturbed flow during use, which improves the operation of the tensioner, particularly in expansion.

The tensioner according to the invention can be further improved.

A possible improvement concerns a second embodiment.

Figure 3:
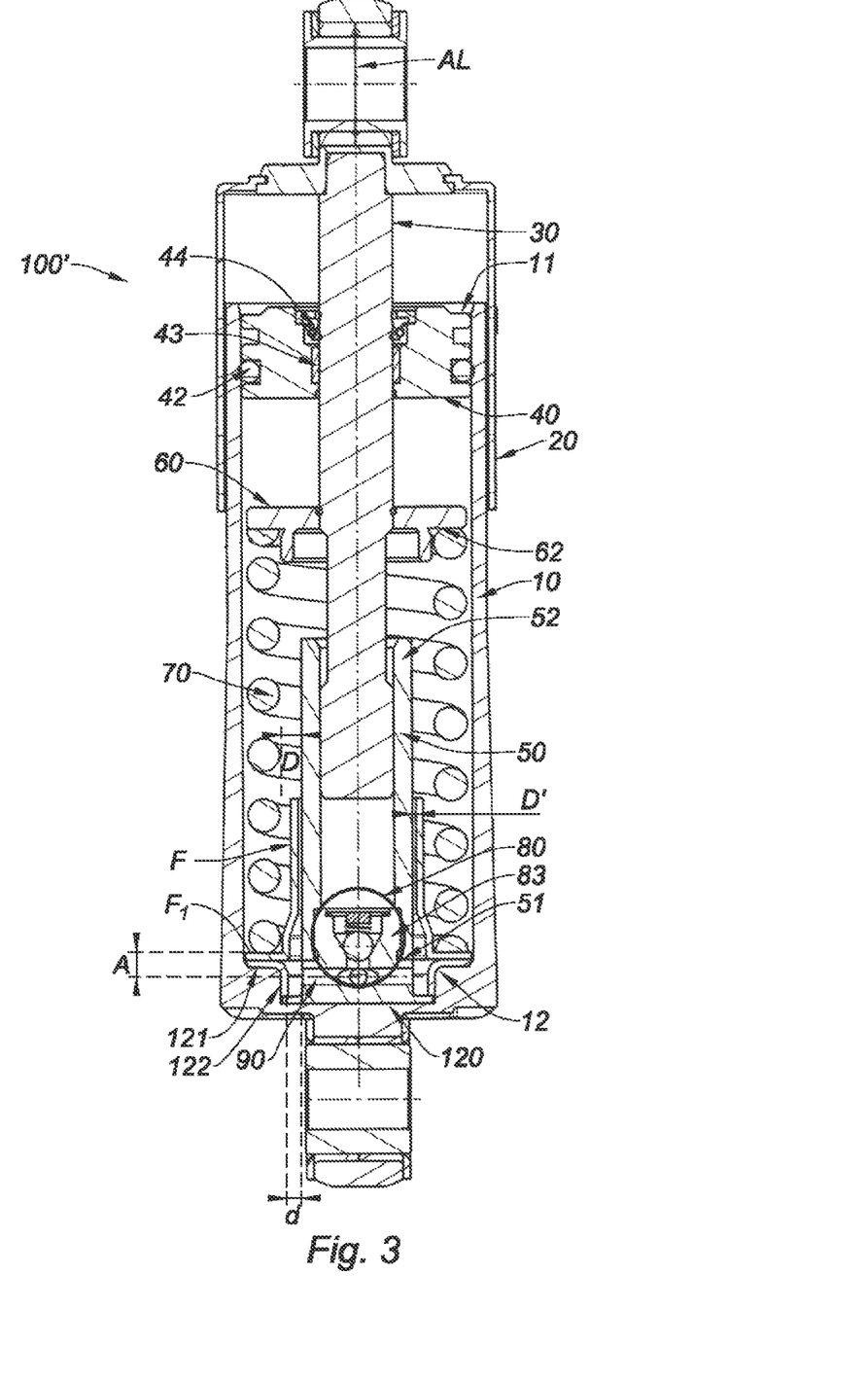
FIG. 3 shows an embodiment variant of the tensioner according to the invention shown in FIG. 2.

This second embodiment of a tensioner 100' according to the invention is shown in FIG. 3.

This tensioner 100' is in all respects consistent with the tensioner 100 of FIG. 2, but also has a sheath F.

The sheath F has an end F1 resting on the cup 124.

The elastic return means 70 then bears on this end F1 of the sheath F.

The sheath F is also arranged around the tube 50 between the elastic return means 70 and the tube 50 at a non-zero distance D', taken radially, from the tube 50. As a result, the region of the hollow body 10 that is free of any obstacle is defined between the sheath F and the tube 50 up to the at least one fluid communication channel 90. It is understood from these comments that the distance D' is strictly smaller than the distance D.

In particular, it can be envisaged that the distance D' is equal to the distance d.

In a variant (not shown), it can be envisaged that the sheath F and the cup 124 only form a single piece. Furthermore, if the distance D' is equal to the distance d, then the inner diameter of this single piece will be constant over its entire height.

This avoids any risk that the fluid, because of its viscosity, is disturbed by the presence and movement of the elastic return means 70, in particular at the outer wall of the tube 50.

Figure 4A:
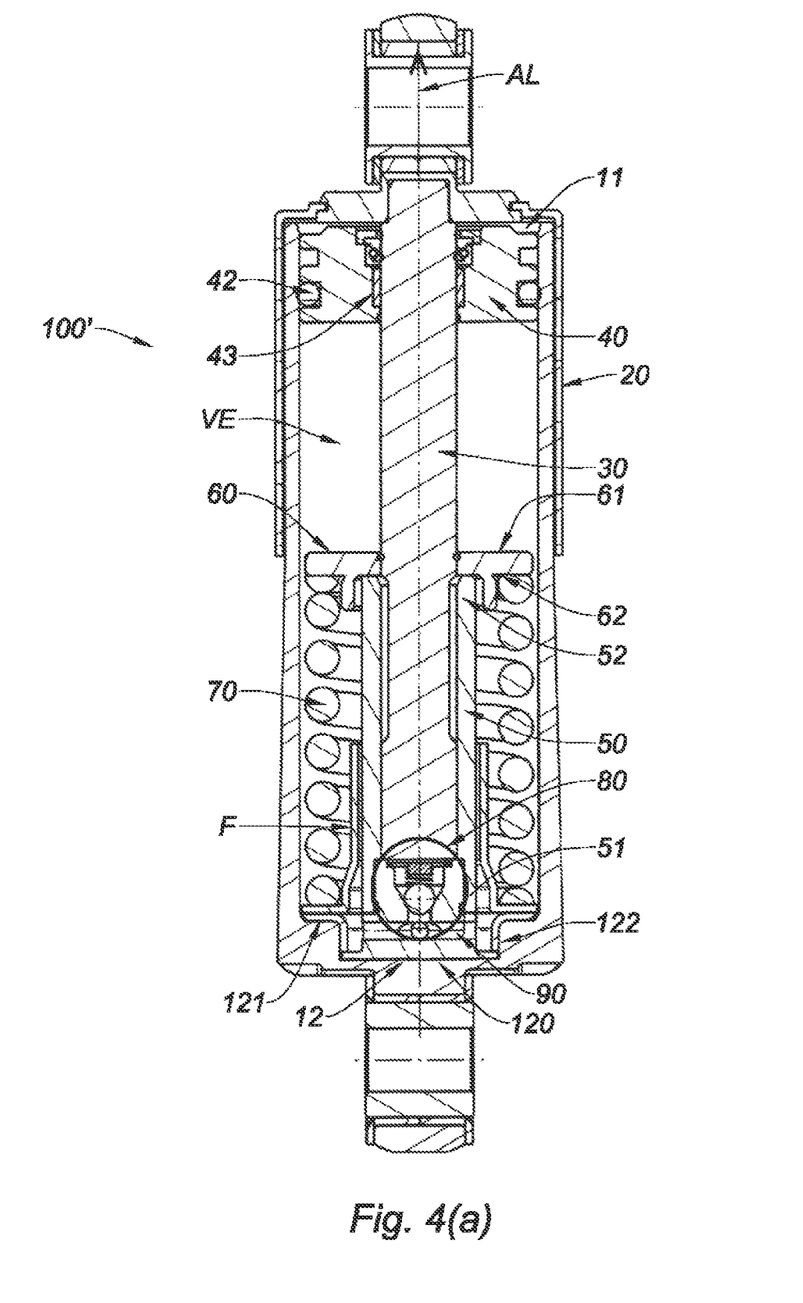
FIGS. 4(a) and 4(b), shows the tensioner of FIG. 3, in two extreme positions.
Figure 4B:
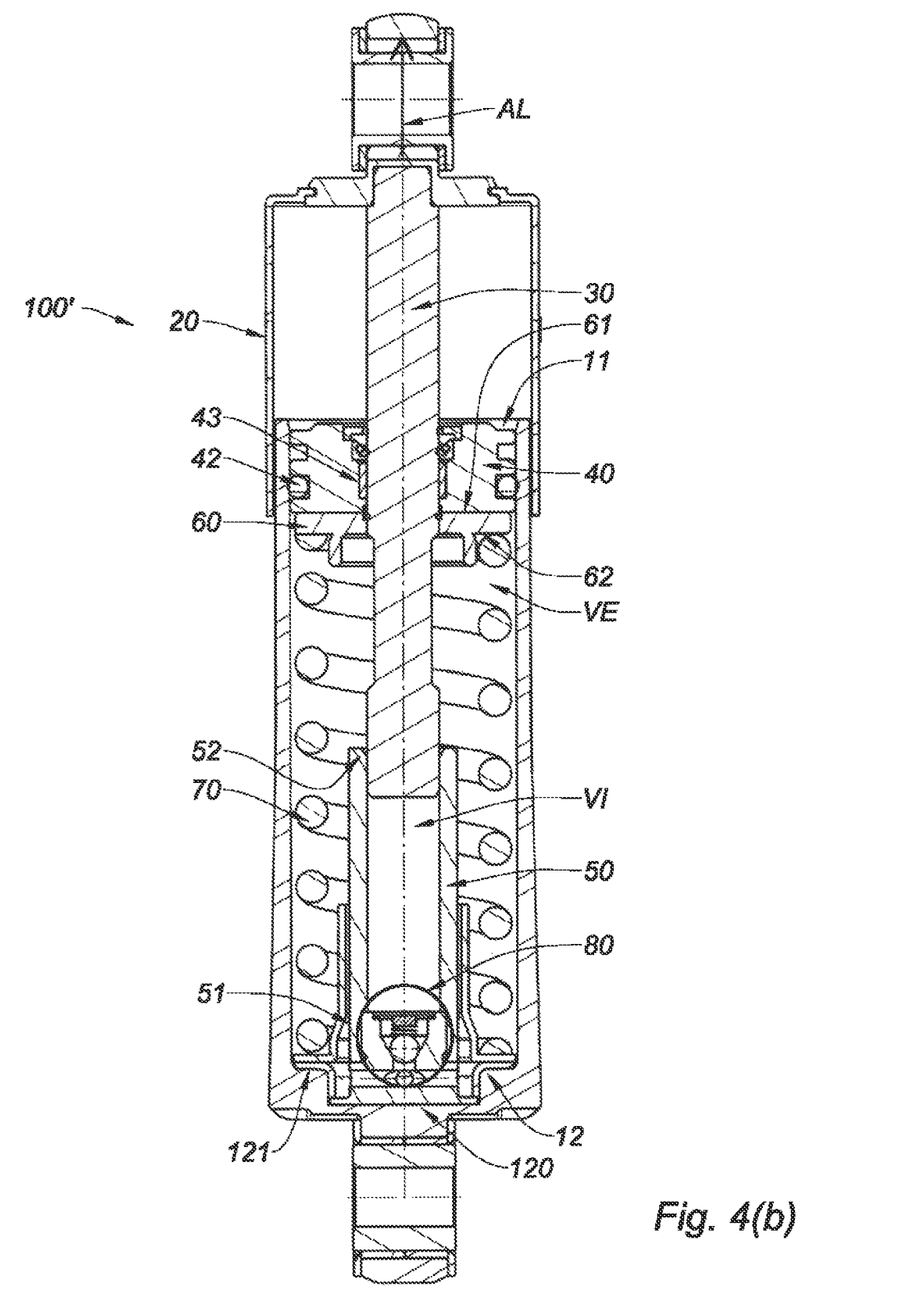

The operation of the tensioner 100' can be specified using FIGS. 4(a) and 4(b).

FIG. 4(a) is a longitudinal sectional view of the tensioner 100', in compression and more precisely in the maximum compression position. In this position, it is noted that the lower wall 62 of the cup 60 is in contact (abutment) with the end 52 (upper end) of the tube 50, which is opposite to the end 51 (lower end). The axis 30 is then in contact with or near the valve 80 so that the inner volume VI is zero or almost zero. All the fluid contained in the hollow body 10 is therefore in the outer volume VE.

FIG. 4(b) is a longitudinal sectional view of the tensioner 100', in expansion and more precisely in the maximum expansion position. In this position, it is noted that the first guide means 40 is in contact (abutment) with the cup 60, more precisely with the upper wall 61 of the cup 60. The inner volume VI is then filled to its maximum and the fluid is present both in the inner volume VI and the outer volume VE.

From the two FIGS. 4(a) and 4(b), the relative axial displacement between the hollow body 10 and the sleeve 20 is also noted.

The operation described above using FIGS. 4(a) and 4(b) for the second embodiment (FIG. 3) is fully applicable to the first embodiment (FIG. 2).

It is also possible to further improve the operation of the tensioner 100, 100', whatever the embodiment, by correctly dimensioning the valve 80.

Figure 5:
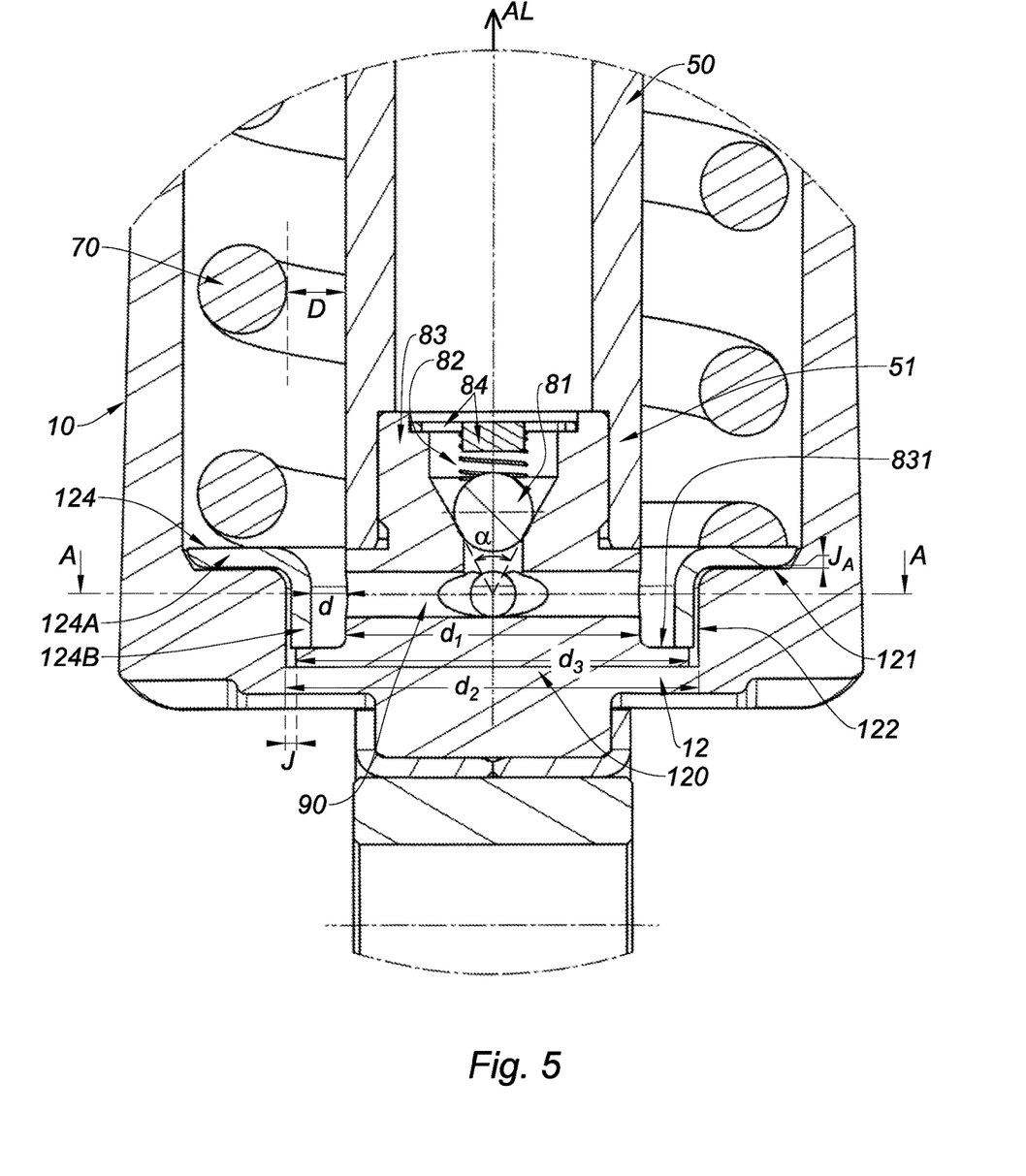
FIG. 5 is an enlarged view of FIG. 1, at the lower portion.

With reference to FIG. 5, the valve 80 comprises a closure member 81, for example a ball, mounted on a dedicated elastic return means 82, for example a spring.

The dedicated elastic return means 82 is fixed relative to the seat 83. More precisely, in this FIG. 5, the dedicated elastic return means 82 is fixedly mounted on a stop 84, for the closure member 81, which stop 84 is clamp-mounted on the seat 83. This stop makes it possible to control the travel of the closure member 81, which can have an impact on the proper operation of the tensioner.

It should be understood that the valve 80 described above for FIG. 5, which is an enlarged view of FIG. 2 compared to the first embodiment, is applicable to the second embodiment (FIG. 3) because the valve 80 is the same in both embodiments.

Figure 7:
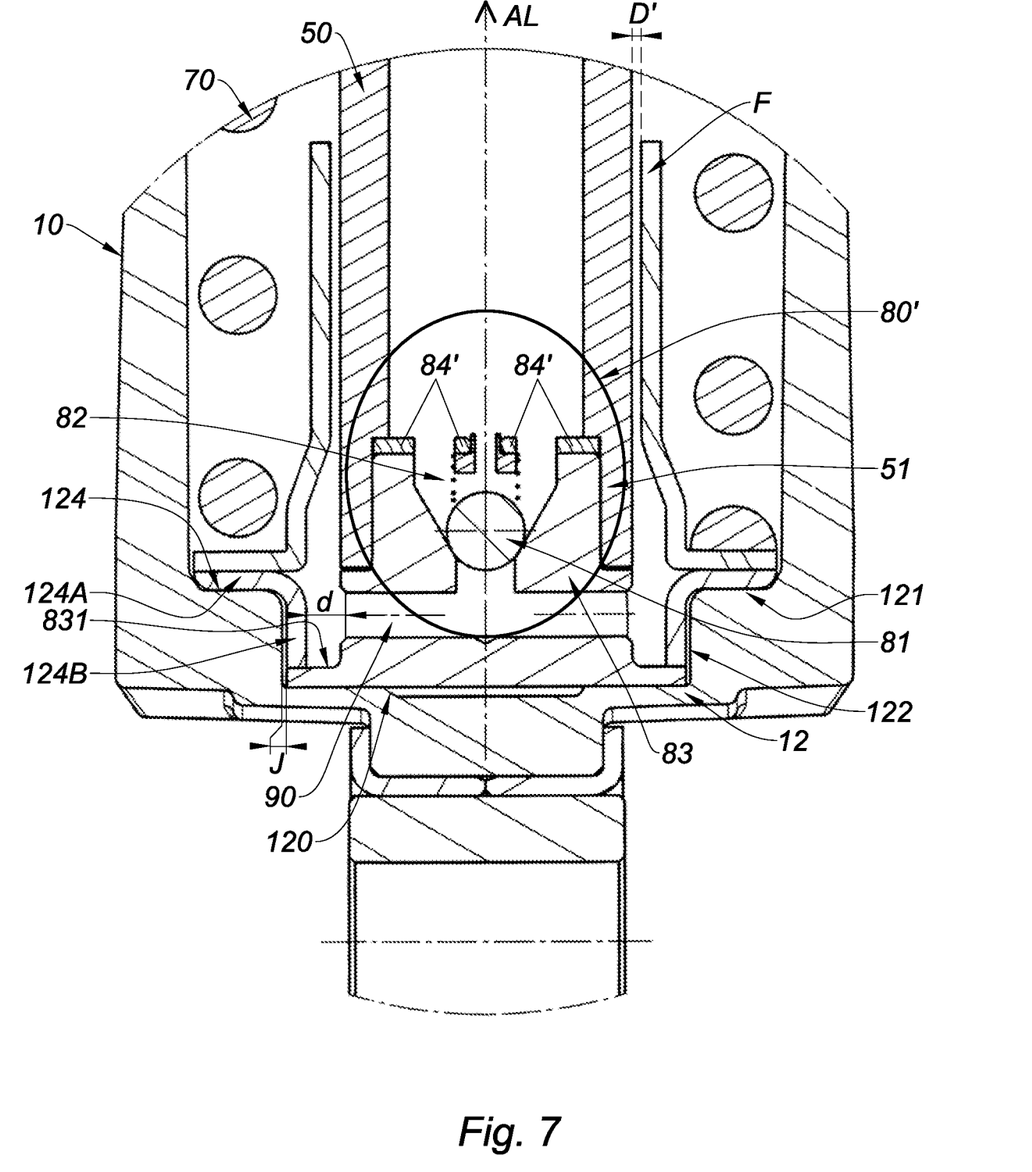
FIG. 7 shows an embodiment variant of a valve used in a tensioner according to the invention.

In an embodiment variant of the valve 80', shown in FIG. 7 on the basis of the second embodiment of FIG. 3, the stop 84' may be centred on the tube 50 and axially clamped to the tube 50 by the seat 83. The stop 84' then has the same function as the stop 84.

This is only one assembly variant.

This does not change the functionality of the valve.

Furthermore, this embodiment variant is entirely applicable to the first embodiment (FIG. 2).

The dedicated elastic return means 82 is generally prestressed to ensure that it exerts a permanent force, which is particularly useful at rest, to hold the closure member 81 against the seat 83, which is attached to the tube 50 at the end 51 thereof. The seat 83 therefore belongs to the valve 80 and also serves, as indicated above, to make the connection between the end of the tube 50 and the central zone 120 of the bottom 12 of the hollow body 10. This force depends on the stiffness k of the dedicated elastic return means 82, but also the deformation thereof relative to its natural equilibrium position.

The valve 80 is then normally closed.

In the case of a ball 81 being used as closure member, a frustoconical seat 83 is particularly advantageous. It enables optimal cooperation with the ball 81.

In use, the tensioner 100, 100' is confronted with a plurality of constraints.

From the rest position, if the tensioner 100, 100' is allowed to relax, it is advantageous to have a closure member, for example a ball 81, which is relatively light. In fact, during the expansion, the depression in the inner volume VI of the tube 50 allows the fluid present in the outer volume VE to enter the inner volume VI and the lighter the ball, the higher the speed of this fluid transfer.

Similarly, during a compression, it is useful for the ball to also be light to ensure that the valve 80 and therefore the tube 50 close to respond as quickly as possible to the stress exerted and consequently to ensure a rapid rise in pressure in the inner volume VI.

However, it is also necessary to take into account the force exerted by the dedicated elastic return means 82 on the closure member 81.

Here, the situation is not symmetrical depending on whether the tensioner 100, 100' is stressed in expansion or in compression.

In fact, in expansion, the presence of the dedicated elastic return means 82, which allows a force to be exerted that pushes the closure member 81 against its seat 83, is to be overcome (preload). It is therefore of the greatest interest to ensure that the tensioner 100, 100' responds rapidly to minimise the preload, which means minimising the stiffness k of dedicated elastic return means 82 and/or its positioning with respect to its natural equilibrium position.

On the contrary, in compression, it is of the greatest interest to provide a high preload because this promotes rapid closure of the valve 80.

As far as the preload is concerned, the requirements for rapid response of the tensioner 100, 100' in both expansion and compression are therefore contradictory.

However, the Applicant found, surprisingly, that it was possible to find a useful compromise on the value of this preload to ensure that the valve 80 opens (expands) or closes (compresses) more quickly, with the understanding that this compromise on the preload is also dependent on the mass of the ball.

According to the Applicant, this ideal compromise can be achieved with:
- a closure member 81 with a mass of between 50 mg and 700 mg; and
- a preload of between 0.05 N and 0.4 N, in a direction so as to push the closure member 81 against the seat 83.

In practice, it is in particular possible to use a dedicated elastic return means 82 having a stiffness of between 30 N.m. and 80 N.m. All that is then required is to adjust the position of the dedicated elastic return means 82 accordingly to obtain the desired preload. In particular, with a conventional spring, the spring is contracted, relative to its natural equilibrium position, by the appropriate value ΔX so that the product k*ΔX, which corresponds to the preload, is within the range of values indicated above.

It is also useful for the travel of the closure member 81 to be kept between two limit values. A minimum travel promotes the passage of fluid between the closure member 81 and the seat 83 during the expansion. On the other hand, a maximum travel prevents the closing time from being slowed down.

In practice, a travel of the closure member 81 of between 0.3 mm and 2.5 mm can be envisaged. In particular, a travel in the range of 1 mm can be envisaged. This makes it possible to improve the supply to the inner volume VI of the tube 50 and to close the same tube 50 correctly and more easily.

As indicated above, this travel can be controlled by the arrangement of the stop 84, 84'.

Furthermore, when a ball is used as closure member 81, it is useful for the seat 83 to have, in its inner portion, a frustoconical shape for cooperating with the ball 81. In this case, the angle α of the cone (see FIG. 5 or FIG. 7) is advantageously between 30° and 90°, in particular about 60°.

Finally, it should be noted that the choice of the working fluid in the tensioner 100, 100' can also have an impact on the operation of the tensioner.

In practice, an oil can be used as the working fluid in the tensioner 100, 100'.

Advantageously, this chosen oil will have a grade chosen from the grades between ISO VG5 and ISO VG150, which are defined by a kinematic viscosity according to the ISO3448 standard. Advantageously, grades ranging from ISO VG10 to ISO VG46 will be selected. These grades allow the tensioner to operate properly within the response time and under the most severe thermomechanical conditions.

The invention claimed is:

1. A tensioner with a longitudinal axis, comprising:
   a hollow body provided with an opening and a bottom, the hollow body comprising a fluid;
   a sleeve arranged around the hollow body,
   an axis,
   a first guide means for said axis, this first guide means being attached to the hollow body at the opening thereof;
   a second guide means for said axis, this second guide means being in the form of a tube that defines an inner volume wherein said axis is intended to move and an outer volume that is outside said second guide means within the hollow body;
   a first cup fixedly mounted on said axis between the first and second guide means of said axis;
   a second cup mounted at the bottom;
   an elastic return means arranged around the second guide means so that there is a non-zero distance, taken radially, between the elastic return means and the second guide means, said elastic return means being held between the first cup and the second cup;

a valve comprising a seat mounted between one end of the second guide means and the bottom of the hollow body, at least one fluid communication channel is associated with said valve to allow the passage of a fluid contained in the hollow body between the outer volume of the second guide means and the inner volume of said second guide means; said bottom comprises a central zone, a peripheral zone that is raised relative to the central zone and an intermediate zone connecting the central zone to the peripheral zone;

the second cup comprises a first portion in front of the peripheral zone and a second portion that is in front of the intermediate zone and is in contact with a base of the seat, this base itself being in contact with the central zone;

the elastic return means is designed to bear on the first portion of the second cup;

said at least one fluid communication channel is arranged to open in front of the second portion of the second cup at a non-zero distance from this second portion, this arrangement allowing a fluid region of the hollow body to be defined around the second guide means up to said at least communication channel, said fluid region being free of any obstacle.

2. The tensioner according to claim 1, wherein the sleeve is movably mounted relative to the hollow body and the axis is fixedly mounted relative to the sleeve.

3. The tensioner according to claim 1, wherein a sheath is provided, one end of which is in contact with the first portion of the second cup, the elastic return means then bearing on this end of the sheath, the sheath being furthermore arranged around the second guide means between the elastic return means and the second guide means at a non-zero distance, taken radially, from the second guide means, so that said fluid region of the hollow body that is free of any obstacle is defined between the sheath and the second guide means up to said at least one fluid communication channel.

4. The tensioner according to claim 1, wherein the elastic return means is a helical spring.

5. The tensioner according to claim 1, wherein the base of the seat has a dimension, taken radially, that is strictly smaller than a dimension, also taken radially, of the central zone of the bottom of the hollow body, so that there is a clearance between the seat and the intermediate zone.

6. The tensioner according to claim 1, wherein the valve further comprises:
   a dedicated elastic return means that is fixed relative to the base; and
   a closure member that is attached to the dedicated elastic return means and rests on the seat.

7. The tensioner according to claim 6, wherein the closure member has a mass of between 50 mg and 700 mg and wherein the dedicated elastic return means is designed to apply a preload of between 0.05 N and 0.4 N in a direction so as to push the closure member against the seat.

8. The tensioner according to claim 7, wherein the dedicated elastic return means has a stiffness k of between 30 N.m. and 80 N.m.

9. The tensioner according to claim 6, wherein, the closure member being a ball, the seat comprises a frustoconical inner portion for cooperating with the ball, this frustoconical inner portion being defined by an angle of between 30° and 90°.

10. The tensioner according to claim 1, wherein the valve comprises a stop designed to control the travel of the closure member.

11. The tensioner according to claim 10, wherein the travel of the closure member is between 0.3 mm and 2.5 mm.

12. The tensioner according to claim 1, wherein the fluid contained in the hollow body is an oil.

13. The tensioner according to claim 12, wherein the oil has a grade defined between the ISO VG5 standard and the ISO VG150 standard, these standards being defined by a kinematic viscosity according to the ISO 3448 standard.

\* \* \* \* \*